(12) United States Patent
Martin

(10) Patent No.: US 6,492,098 B2
(45) Date of Patent: Dec. 10, 2002

(54) PROCESS TO IMPROVE THE FUNCTIONING OF A MEMBRANE OF A NANOFILTRATION DEVICE

(75) Inventor: Didier J. Martin, Givry (FR)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/907,977

(22) Filed: Jul. 18, 2001

(65) Prior Publication Data

US 2002/0031733 A1 Mar. 14, 2002

(30) Foreign Application Priority Data

Jul. 28, 2000 (FR) .............................. 00 09895

(51) Int. Cl.$^7$ ........................... G03C 5/31; G03C 5/395; G03C 7/44
(52) U.S. Cl. ....................................... 430/398
(58) Field of Search ......................... 430/398

(56) References Cited

U.S. PATENT DOCUMENTS

| 4,758,505 A | 7/1988 | Hoffmann .................. 430/569 |
| 4,784,771 A | 11/1988 | Wathen et al. .............. 210/636 |
| 5,169,383 A | * 12/1992 | Gyory et al. ................. 604/20 |

FOREIGN PATENT DOCUMENTS

| EP | 0 409 065 A1 | 1/1991 |
| EP | 0 585 180 A1 | 3/1994 |
| EP | 0 687 496 A1 | 12/1995 |

* cited by examiner

*Primary Examiner*—Hoa Van Le
(74) *Attorney, Agent, or Firm*—David A. Novais

(57) ABSTRACT

A method to improve the functioning of a membrane of a nanofiltration device provided to filter a solution optimizes the retention rate of the membrane. In the method, the permeate and the retentate are circulated through the nanofiltration membrane for a time before starting to use the membrane. The method is applicable to the treatment of photographic baths.

6 Claims, 1 Drawing Sheet

PROCESS TO IMPROVE THE FUNCTIONING OF A MEMBRANE OF A NANOFILTRATION DEVICE

FIELD OF THE INVENTION

The present invention relates to a method of improving the functioning of a membrane of a nanofiltration device, and in particular to improving the functioning of a membrane utilized in a treatment method of a photographic bath.

BACKGROUND OF THE INVENTION

Many manufacturing or processing methods produce wastewater that, on the one hand, cannot be cleared directly into drains because of their composition and, on the other hand, contain precious substances whose recovery and reuse may have economic advantages. One may cite the example of the photo processing industry, where exposed photographic films and papers go through several treatment baths, after which the chemical products must largely be removed from the finished products. Such treatment methods for photographic films are well known (e.g. see, *Chimie et Physique Photographiques*; Pierre Glafkides; Vol. 2; Chap. XL, pages 947–967).

It is common to use systems for treating and recycling the wastewater, in particular nanofiltration devices. Nanofiltration is a technique utilized for the selective separation of salts and organic compounds in solution. The membranes used for nanofiltration thus behave like sieves with a large area having microscopic or molecular size pores whose dimensions have to be very even in order for the molecules of a given size to be retained, while smaller molecules or the ions of simple salts pass through the membrane. Membranes for nanofiltration usually let pass molecules whose molecular weight is between 200 and 1,000 daltons. Multivalent ionized salts and non-ionized organic compounds with molar mass more than 1,000 daltons are, however, largely retained. The solution that has crossed the membrane is called the filtrate or permeate and the solution that is retained by the membrane is called the concentrate or retentate.

Nevertheless, it has been noticed that the retention rate of membranes is not optimal during treatment, i.e. a not insignificant amount of substances to be filtered is found in the permeate. This problem is especially important in the nanofiltration systems utilized discontinuously, provided to treat different batches of solution.

SUMMARY OF THE INVENTION

An object of the invention is to provide a method to improve the functioning of a membrane of a nanofiltration device provided to filter a solution so as to optimize the retention rate of a membrane.

The invention relates to a method to improve the functioning of a membrane of a nanofiltration device provided to filter a solution, in which the permeate in the solution to be filtered is recycled, and wherein, before the start of utilization of the membrane, the permeate and the retentate are circulated through the nanofiltration membrane for a set time.

BRIEF DESCRIPTION OF THE DRAWING

Other characteristics will appear on reading the description that follows, making reference to the drawing wherein.

DETAILED DESCRIPTION OF THE INVENTION

Figure 1:
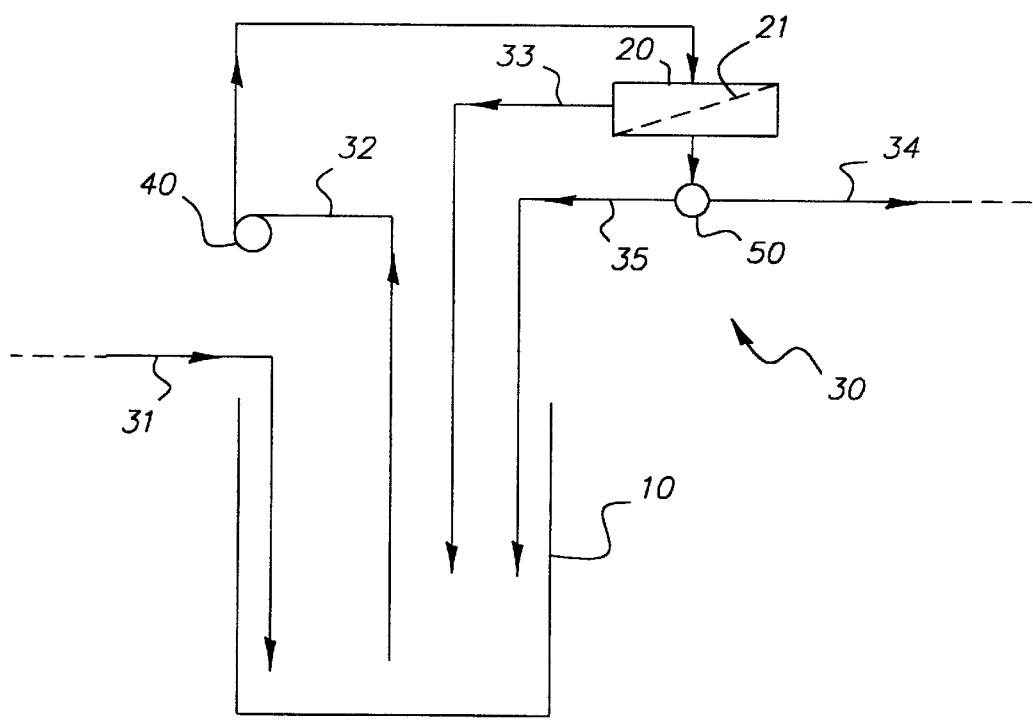
FIG. 1 shows a device which enables the use of a nanofiltration module according to the present invention.

In the following description, the method of the invention to improve the functioning of a membrane of a nanofiltration device will be described in a nanofiltration device utilized to treat a photographic bath. But clearly the method of the invention can be used in any nanofiltration system for treating any type of effluent, in particular effluents having a relatively high saline concentration.

With reference to FIG. 1, a device can be seen for using a nanofiltration device. The device comprises a tank 10 in which is found the solution to be filtered and recycled. The device also comprises a nanofiltration module 20 comprising a membrane 21 through which the solution to be treated is circulated. The solution circulates in a set of pipes 30. The tank 10 is fed with solution by a first pipe 31 coming from the treatment bath. A second pipe 32 enables the solution contained in the tank 10 to be taken to the nanofiltration module 20. A pump 40 enables the solution to be moved in this pipe and the flow rate of the solution to be regulated through the nanofiltration module. A third pipe 33 is provided to take the retentate into the tank 10. A fourth pipe 34 is provided to clear the permeate from the device so as to recycle it in the treatment bath (not shown). This pipe 34 is used in production mode, i.e. when the solution contained in the tank 10 is treated.

Further the device comprises a fifth pipe 35 in which the permeate is taken to the tank 10. This pipe 35 is only used when the device is in initialization mode, i.e. in a configuration used before the production mode after membrane balancing. A three-way valve 50 enables switching between the two use modes, i.e. the initialization mode and the production mode.

During the treatment of a solution, a specified amount of solution to be filtered and recycled, coming from a photographic treatment bath, is collected in the tank 10. For a set time, e.g. for several minutes, the nanofiltration device is used in initialization mode until the membrane 21 is ionically balanced. The initialization phase lasts between 1 and 10 minutes, preferably between 2 and 5 minutes. The solution present in the tank 10 is pumped using pump 40. The nanofiltration module 20 is fed in this way. The membrane 21 enables separation of the retentate and the permeate which are sent back into the tank 10 through the pipes 33 and 35 respectively. In this way the membrane 21 is balanced and its separation quality is increased so as to obtain a permeate that is the most purified possible. After having used the device in an initialization mode, it can be used in production mode. Therefore, the permeate is cleared from the device by the pipe 34 and recycled into the photographic treatment bath.

Preferably, at the end of use in production mode, the nanofiltration device is rinsed with a relatively small volume of rinsing solution. The rinsing solution is, for example, mains water, distilled water, or even permeate. Preferably, the device is rinsed with a volume approximately equal to three to ten times the dead volume of the device, the dead volume being the volume liable to be contained in the device outside the tank 10, i.e. in the nanofiltration module 20, the pipes 30, and the pump 40.

The invention is described in detail in the following example.

EXAMPLE

In this example, the nanofiltration device is utilized to treat a photographic bath.

Washing water coming from a seasoned stabilization bath is collected in the tank 10 through pipe 31. When the tank is full, the pump is run and the two modes previously described are operated.

In this way 10 liters of stabilization bath are filtered with a nanofiltration module equipped with an NF45 FILMTEC® membrane with useful area 2.21 m². The feed rate of the nanofiltration module is 600 l/h with a mean pressure of 30 bar.

The bath comprises:

Thiosulfate: 13,308 mg/l

Sulfate: 9,921 mg/l

Silver: 920 mg/l

Iron: 2,650 mg/l

COD (Chemical Oxygen Demand): 33,440 mg/l

TOC (Total Organic Carbon): 8,100 mg/l

The permeate was sampled at various outputs of recycled water, the output being defined thus:

$$R = \frac{\text{permeate volume}}{\text{initial volume of solution to be treated}} \times 100$$

Table I groups together the analysis of the concentration of the various chemical compounds contained in the permeate for a permeate output of 70%. The first column shows the concentration of the chemical compounds present in the permeate when the nanofiltration device is used directly in production mode, without initialization phase. The second column shows the concentration of the chemical compounds present in the permeate when the nanofiltration device is used with an initialization phase before the production mode according to the invention. In this second case, the initialization phase lasts about five minutes. In both cases, the concentration of the contaminating chemical compounds in a tank is measured in which the permeate coming from the pipe 34 is recovered when the volume of permeate collected is 70% of the initial volume to be treated.

TABLE I

| Chemical compound | Concentration (mg/l) in the permeate | |
|---|---|---|
| | Without initialization phase | With initialization phase (invention) |
| Thiosulfate | 1,536 | 820 |
| Sulfate | 674 | 435 |
| Silver | 44 | 22 |
| Iron | 35 | 6.3 |
| COD | 8,170 | 5,840 |
| TOC | 2,260 | 1,650 |

Table II groups together the analysis of the concentration of the various chemical compounds contained in the permeate for a permeate output of 90%. The first column shows the concentration of the chemical compounds present in the permeate when the nanofiltration device is used directly in production mode, without initialization phase. The concentration is then measured. The second column shows the concentration of the chemical compounds present in the permeate when the nanofiltration device is used with an initialization phase before the production mode according to the invention. In this second case, the initialization phase lasts about five minutes. In both cases, the concentration of the contaminating chemical compounds in a tank is measured in which the permeate coming from the pipe 34 is recovered when the volume of permeate collected is 90% of the initial volume to be treated.

TABLE II

| Chemical compound | Concentration (mg/l) in the permeate | |
|---|---|---|
| | Without initialization phase | With initialization phase (invention) |
| Thiosulfate | 3,739 | 1,923 |
| Sulfate | 1,272 | 678 |
| Silver | 115 | 51 |
| Iron | 60 | 15 |
| COD | 9,100 | 8,110 |
| TOC | 2,425 | 2,190 |

These examples show that when an initialization phase is used in the nanofiltration process, the concentration of filtered chemical compounds that are found in the permeate decreases significantly. In this way the functioning of the nanofiltration membrane is improved.

The invention has been described in detail with particular reference to certain preferred embodiments thereof, but it will be understood that variations and modifications can be effected within the spirit and scope of the invention.

I claim:

1. A method of improving a functioning of a membrane of a nanofiltration device provided to filter a solution having a permeate and a retentate, in which the permeate in the solution to be filtered is recycled, wherein, before starting a utilization of the membrane, the method comprises circulating the permeate and the retentate through the nanofiltration membrane for a set time.

2. The method according to claim 1, wherein the permeate and the retentate are circulated through the nanofiltration membrane until the membrane is ionically balanced.

3. The method according to claim 1, wherein the permeate and the retentate are circulated through the nanofiltration membrane for a time between 1 and 10 minutes.

4. The method according to claim 3, wherein the permeate and the retentate are circulated through the nanofiltration membrane for a time between 2 and 5 minutes.

5. The method according to claim 1 wherein, at the end of use of the membrane, the nanofiltration device is rinsed with a quantity of rinsing solution equal to three to ten times the dead volume of the nanofiltration device.

6. A treatment method of a photographic bath wherein the method of claim 1 is used to improve the functioning of a membrane.

* * * * *